UNITED STATES PATENT OFFICE.

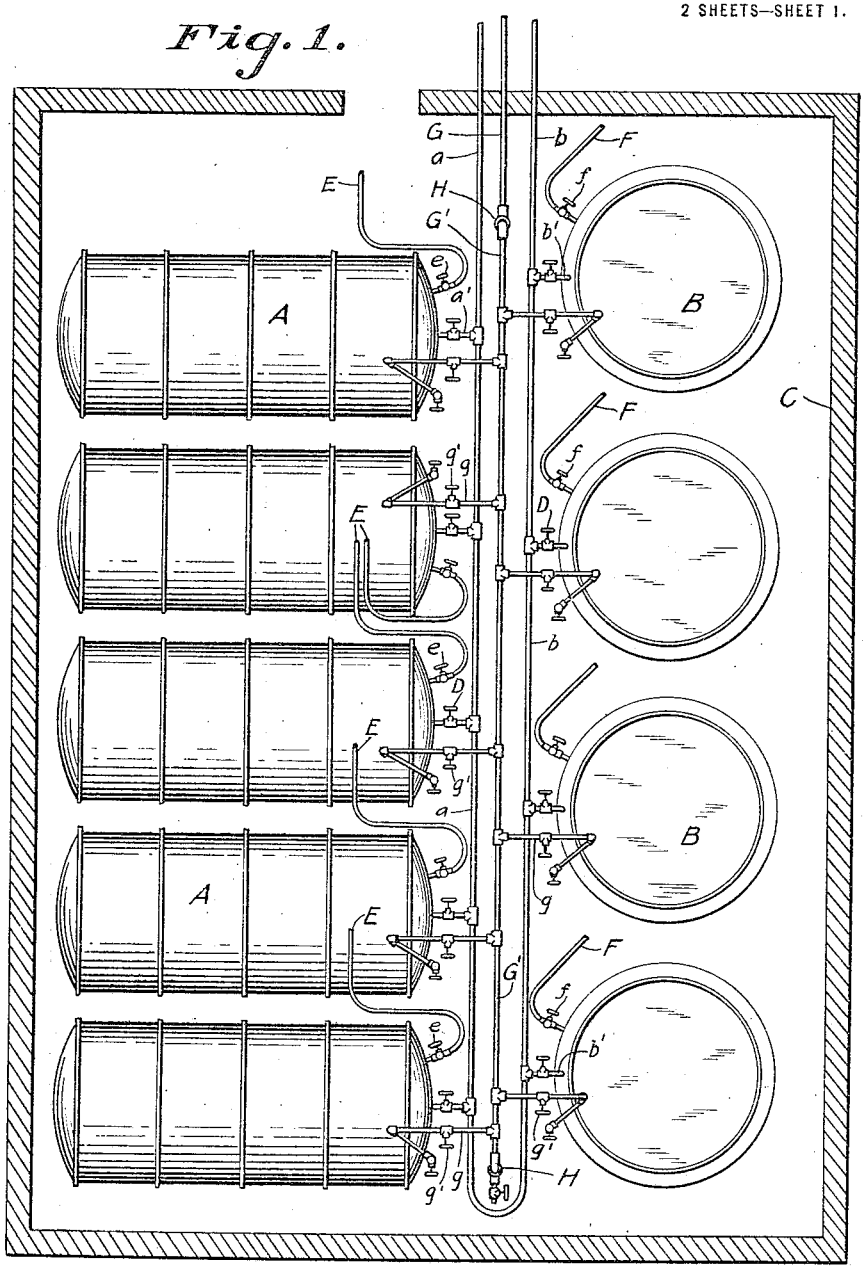

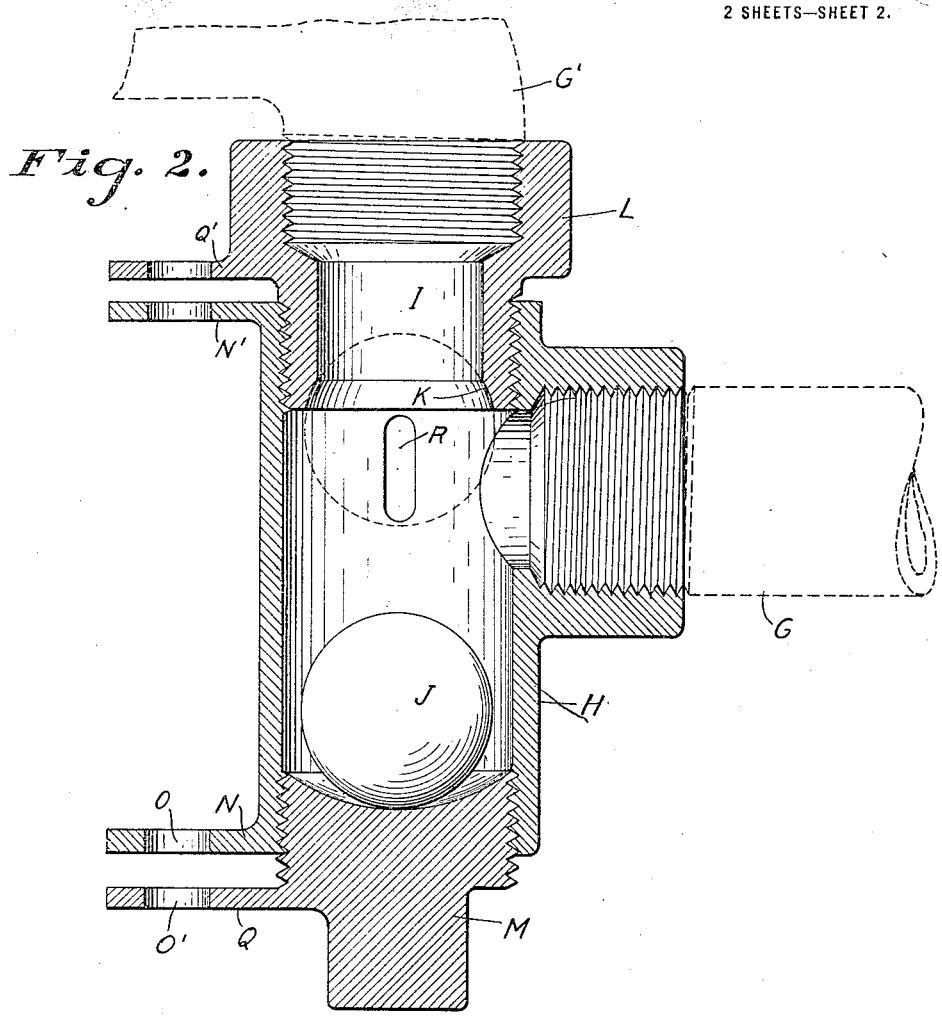
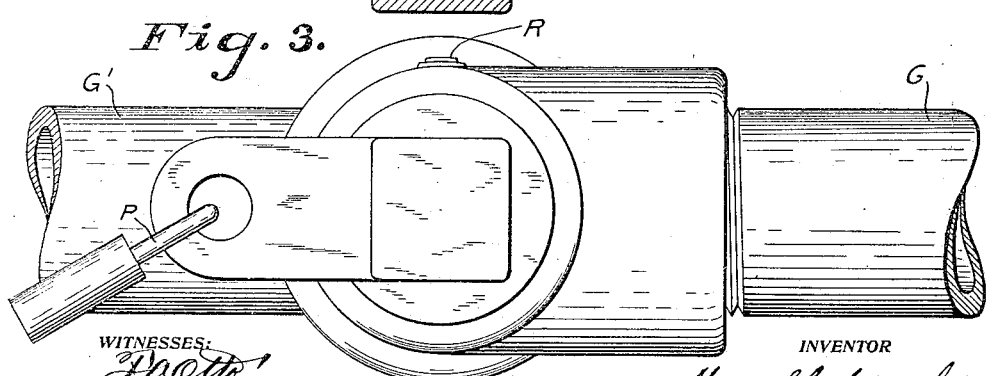

MAX LUPINSKI, OF MILWAUKEE, WISCONSIN.

MEASURING AND INSPECTION TANK FOR LIQUIDS.

1,294,499.    Specification of Letters Patent.    Patented Feb. 18, 1919.

Application filed May 11, 1917. Serial No. 167,988.

*To all whom it may concern:*

Be it known that I, MAX LUPINSKI, a citizen of the United States, residing at Milwaukee, county of Milwaukee, and State of Wisconsin, have invented new and useful Improvements in Measuring and Inspection Tanks for Liquids, of which the following is a specification.

My invention relates to improvements in measuring and inspection tanks for liquids. The object of my invention is to provide means for preventing fraudulent deliveries of liquor to the tanks through the pressure applying mains after the tanks have been inspected.

Liquors subject to taxation are required to be measured, and for that purpose are delivered into inspection tanks before being bottled or packaged for commercial use. The liquid in such tanks is kept under pressure in order to prevent deterioration and facilitate deliveries for commercial use, either carbonic acid gas or air being employed as the pressure applying means. The air or carbonic acid gas is delivered to the tanks through a set of pipes or mains, from which branch pipes lead to the respective tanks, and in some instances quantities of liquor have been introduced through these air or gas mains after the tanks have been inspected and their contents ascertained or measured. In some instances additional liquor has been introduced after inspection and while liquid is being withdrawn from the lower portion of the tank for packaging purposes, and objection has therefore been made by the inspectors to the use of pipe systems for supplying the air or gas, by means of which pressure is maintained in the tanks.

More particularly therefore, my invention has for its object the provision of means whereby delivery of liquid through the air or gas mains may be prevented, and I propose to accomplish this object by providing a valve which will permit air or gas to pass freely to the tanks, but will close automatically in case it is attempted to pass liquid through the pipes.

In the drawings:

Figure 1 is a diagram of an inspection chamber having an air or gas supply system embodying my invention, the walls of the chamber being illustrated in horizontal section.

Fig. 2 is a vertical sectional view of an automatic valve mechanism embodying my invention.

Fig. 3 is a bottom view of the same.

Like parts are identified by the same reference characters throughout the several views.

Referring to Fig. 1, it will be observed that a series of tanks A and B are inclosed within a chamber, the walls C of which are illustrated in horizontal section. The liquor to be measured is supplied to the tanks A and B through mains $a$ and $b$ respectively, from which branch pipes $a'$, $b'$ lead to the respective tanks A and B, each of these branch pipes being provided with a valve at D. The liquor may be withdrawn from the respective tanks A and B through the pipes E and F, having valves at $e$, $f$ respectively. The end portions of these pipes extend into the respective tanks at or near the bottom thereof, and the liquor is forced out through these pipes E and F by the pressure of air or gas delivered to the respective tanks from a main G, through branches $g$ valved at $g'$. All of these parts may be of any ordinary construction.

After inspecting one or more of the tanks, the inspector thereupon closes the valve D, controlling liquid delivery into such tank, and opens the valve $g'$ to permit air or gas delivery to such tank, each of these valves D and $g'$ being thereupon locked and sealed, after which the inspector opens the outlet valve $e$, (or $f$), thus permitting a withdrawal of the liquor to be bottled, or packaged. It will, of course, be understood that when one of the tanks has been inspected and its valve D closed and locked, the liquid may thereupon be withdrawn for commercial purposes through the pipes E, (or F) under the pressure supplied through the air main G after the inspector has opened the controlling valve $g'$.

To prevent liquor from being introduced through the main G after inspection or while the liquor is being withdrawn from any one of the tanks through the pipes E, (or F) I connect the main G with a valve casing H. This valve casing has an outlet port I at the top, through which the air or gas from the main G may pass into a duct G', which constitutes a continuation of the main G. From this continuation G' the air or gas may be delivered to the respective tanks through branch ducts $g$, each controlled by a valve at $g'$.

The valve casing H is provided with a spherical float valve J which normally rests upon the bottom of the casing, but which is adapted to float upon any liquid within the casing H, whereby the ball J may eventually rise to closing position in contact with the spherically rounded seat K, as indicated by the dotted lines in Fig. 2. The side walls of the casing H are preferably cylindrical in form. In any event they are so arranged that when the float valve J is lifted by liquid within the chamber H it will be guided to the seat K. The seat K is preferably formed at the lower end of a removable plug L, which is enlarged and interiorly screw threaded at its upper end to receive the pipe G'. The lower end of the chamber H is closed by a removable plug M, which also has screw threaded engagement with the interiorly threaded side walls of the casing. The lower end of the casing is provided with a projecting arm N provided with an aperture O to receive the hasp P of a suitable lock. The plug M is provided with a similar arm Q having an aperture O' through which the hasp P may also be passed, whereby the plug M may be locked to prevent its removal by an unauthorized person. Similar arms N' and Q' may be provided at the upper end of the casing, whereby the plug L may also be locked if desired. By unlocking and removing either of the plugs access may be had to the interior of the valve casing, whereby the ball valve J may be inspected or removed and replaced in case it is found to be defective.

If desired, the casing H may be provided with one or more sight apertures R, through which the interior may be inspected without opening the casing. These apertures will, of course, be closed by a glass panel sealed in the walls of the chamber.

With the construction illustrated, it is obvious that air or gas will be allowed to pass freely from the pipe G to its extension G' through the valve casing H, the ball valve J being held by gravity at the lower end of the valve chamber. But, in case it is attempted to pass liquid through the pipes G, G', ball valve J will rise as chamber H fills with the liquid, until this valve contacts with the seat K, thereby preventing the liquid from passing into the pipe G'. By locking the screw plugs at the top and bottom of the chamber, the inspector can prevent the removal of the float valve J or injury thereto, and by frequently inspecting the float valve its condition may be ascertained and the valve removed and replaced when necessary.

It is, of course, possible to weld or otherwise permanently close the upper and lower ends of the valve chamber H, thereby dispensing with the removable plugs and locking devices, and these features are therefore not regarded as essential to my invention, it being possible to remove the entire valve casing in case the ball valve J should be found defective. On the other hand, it is possible to inspect the interior of the chamber H by removing the plug M, and therefore where a removable plug is employed it is not necessary to provide the sight aperture R, and I therefore do not limit the scope of my invention to include a valve casing having such a sight aperture as an essential feature.

I claim:

1. The combination with an air tight measuring chamber for liquids, provided with liquid supply and delivery ducts, and also provided with a supply duct for air or gas, of a valve casing having its upper end connected with said last mentioned duct, means for delivering air or gas to said chamber through said supply duct and valve casing, and a float valve located within said valve casing and adapted to be lifted by liquid in said valve casing, said valve when lifted being adapted to prevent fluid delivery to said measuring chamber.

2. The combination with an air tight measuring chamber for liquids, provided with liquid supply and delivery ducts, means for closing and opening said ducts, a supply duct for air or gas leading to said chamber, and means for preventing liquid deliveries therethrough.

3. The combination with a measuring chamber for liquids, provided with a pipe connection for delivering elastic fluids to said chamber, of a valve chamber interposed in said pipe connection and provided with an outlet port, and an upwardly seating float valve adapted to close said outlet port, said casing having an inlet port below the valve seat.

4. The combination with a measuring chamber for liquids, liquid supply and delivery ducts connected with said chamber, means for temporarily preventing the passage of liquids through said ducts, a third duct leading to said chamber and adapted to deliver elastic fluid thereto from a suitable source of supply, said third duct having an upwardly extending portion constituting a valve casing, a float valve located in said casing and seating upwardly, said valve being adapted to automatically close by buoyancy when liquid is delivered into said casing, said casing being provided with an inlet below the valve seat and an outlet above the valve seat connected with said chamber.

5. The combination with a measuring chamber for liquids, liquid supply and delivery ducts connected with said chamber, means for temporarily preventing the passage of liquids through said ducts, a third duct leading to said chamber and adapted to deliver elastic fluid thereto from a suitable source of supply, said third duct having an upwardly extending portion constituting a valve casing, a float valve located in said casing and seating upwardly, said valve being adapted to automatically close by buoyancy when liquid is delivered into said casing, said casing being provided with an inlet below the valve seat and an outlet above the valve seat connected with said chamber, a removable plug controlling access to said casing, and means for locking said plug in closing position.

6. The combination with a measuring chamber for liquids, liquid supply and delivery ducts connected with said chamber, means for temporarily preventing the passage of liquids through said ducts, a third duct leading to said chamber and adapted to deliver elastic fluid thereto from a suitable source of supply, said third duct having an upwardly extending portion constituting a valve casing, a float valve located in said casing and seating upwardly, said valve being adapted to automatically close by buoyancy when liquid is delivered into said casing, said casing being provided with an inlet below the valve seat and an outlet above the valve seat connected with said chamber, together with means for inspecting the interior of said chamber without opening the latter.

In testimony whereof I affix my signature in the presence of two witnesses.

MAX LUPINSKI.

Witnesses:
HARRY WEINGANDT,
WM. R. WHITE.

Copies of this patent may be obtained for five cents each, by addressing the "Commissioner of Patents, Washington, D. C."